United States Patent [19]

Verborgt

[11] 4,065,438

[45] Dec. 27, 1977

[54] PROCESS FOR PRODUCTION ACID POLYESTER RESINS AND POWDER COATING PRODUCTS PREPARED FROM SAID RESINS

[75] Inventor: Jozef Verborgt, Brussels, Belgium

[73] Assignee: Labofina S. A., Brussels, Belgium

[21] Appl. No.: 764,902

[22] Filed: Feb. 1, 1977

[30] Foreign Application Priority Data

Feb. 2, 1976   Belgium ................................. 163996

[51] Int. Cl.$^2$ .............................................. C08G 63/12
[52] U.S. Cl. .................................. 260/75 R; 260/835
[58] Field of Search .............................. 260/75 R, 835

[56] References Cited

U.S. PATENT DOCUMENTS

| 3,397,254 | 8/1968 | Wynstra et al. | 260/835 |
|---|---|---|---|
| 3,759,854 | 9/1973 | Chang et al. | 260/21 |
| 4,012,363 | 3/1977 | Bruning et al. | 260/75 R |

*Primary Examiner*—Lucille M. Phynes

[57] ABSTRACT

Disclosed is a process for producing acid polyester resins used for the manufacture of coatings, especially powder coatings, wherein a prepolymer having a hydroxyl index of between 40 and 200 is reacted with isophthalic acid to form an acid polyester resin having an acid index between 50 and 100 which is further reacted with an epoxy resin.

5 Claims, No Drawings

PROCESS FOR PRODUCTION ACID POLYESTER RESINS AND POWDER COATING PRODUCTS PREPARED FROM SAID RESINS

The present invention relates to a process for producing polyester resins, and more particularly to a process for producing acid polyester resins.

Generally these acid polyester resins are used as base product for preparing powder coating products obtained by reacting these resins with an epoxy resin.

The usual method for producing acid polyester resins consists in reacting in a first step an alcohol or more particularly a glycol such ethyleneglycol or neopentylglycol, with terephthalic acid in order to obtain a prepolymer having free hydroxyle group at each side of the chain. In a second step, this prepolymer is reacted with trimellitic acid or its anhydride in order to obtain a tetrafunctional acid polyester resin.

The prepolymer may also be reacted with phthalic anhydride, but the obtained resin has then a too low softening point.

The final coating product results from the reaction of this tetrafunctional acid resin with a bifunctional epoxy resin.

It has also been observed that such a powder coating product gelifies too rapidly, and therefore the powder coating product has neither the time to flow nor the time to extend, and it results that the coated surface has an aspect of orange peel.

Moreover, it is well known that the base polyester resins, which are essentially linear, contain trimers and tetramers which easily tend to crystallize. This crystallization is detrimental not only for the manufacture of the powder, but also for the discharge of the reactor.

The object of the present invention is to remedy these drawbacks.

Another object of the present invention is a process for producing acid polyester resins which is not only merer than other known processes but which moreover allows to obtain a final coating product having improved physical properties.

An advantage of the process of the present invention for producing the final coating products resides in a shorter curing time or in a lower curing temperature in order to obtain coating products having properties equivalent to those of known products.

The process of the invention for producing acid polyester resins which are used to manufacture coating products by reaction with an epoxy resin, said acid polyester resins being produced from a prepolymer having a hydroxyle index comprised between 40 and 200, said prepolymer being prepared from at least one divalent aliphatic alcohol and a mixture of organic acids, is characterized by the fact that said mixture of organic acids comprises from 10 to 100% by weight of terephthalic acid, from 0 to 90% by weight of isophthalic acid and from 0 to 20% by weight of trimellitic acid or its anhydride, and that the acid polyester resin is prepared by reacting said prepolymer with isophthalic acid, said acid polyester resin having an acid index comprised between 50 to 100.

It has been unexpectedly found that the use of isophthalic acid in the preparation of the prepolymer allows to obtain a resin having a very high softening point, although it is well known that the use of isophthalic acid instead of terephthalic acid for the manufacture of polyester resins results in a significative lowering of the softening point of the resin.

Moreover, it has been found that the tendancy to crystallization of these new resins is significantly less than in resins prepared with terephthalic acid only.

It has also been found that the hardening reaction of the powder is easier to carry out with isophthalic acid than with trimellitic acid or its anhydride and this is probably due to the less steric hindering of isophthalic acid.

It is already interesting to carry out the reaction between a bifunctional polyester resin and a bifunctional epoxy resin; however it is advantageous to slightly increase the functionality of the polyester resin in order that it is preferably comprised between 2 and 3.

The functionality of the polyester resin is the total number of acid groups present at the side of the polymer chain.

In order to increase the functionality, a low amount of trimellitic acid or its anhydride is added during the reaction for preparing the prepolymer.

The prepolymer is prepared according to a process which consists in reacting a divalent aliphatic alcohol, more particularly ethyleneglycol, used in an amount corresponding to 25 to 35% by weight based on the total weight of the mixture, with terephthalic acid, used in an amount of 35 to 50% by weight, trimellitic acid or its anhydride, used in an amount of 8 to 15% by weight, and isophthalic acid, used in an amount of 5 to 30% by weight, in the presence of a catalyst selected from the group consisting of organo-tin compounds, organo titanium compounds, or even mineral or organic acids.

The mixture is heated at a temperature comprised between 170° 200° C. Then, the reaction temperature is increased up to about 240° C. and this temperature is maintained until water is no longer formed by the reaction.

The resin is let to cool up to 220° C and at this time isophthalic acid is added in an amount corresponding to 20 to 30% by weight based on the total weight of the prepolymer. According to another embodiment of the process, a mixture of isophthalic and adipic acid is added, the weight of the mixture of these acids corresponding to 20 to 30% of the total weight of the prepolymer.

The temperature is again increase up to about 240° C and the reaction is completed.

From this acid polyester resin having a functionality comprised between 2 and 3, a powder coating product is prepared according to a process which consists in mixing 20 to 40% by weight of the above acid polyester resin, with 20 to 60% by weight of an epoxy resin and 20 to 60% by weight of titanium dioxide; the usual additives such as antioxidants, catalysts, stability improvers and flow improvers are added to this mixture, which is then extruded. The powder is thereafter obtained by crushing the extrusion product.

The obtained powders give coatings which are characterized by their uniform aspect and by their hardening time which is particularly short. Such properties are typically advantageous for various applications, for instance for the coating of supports, such as paper, which must be handled or wound a very short time after having been coated.

The following examples are included herein to more fully illustrate the present invention, it being understood that they are intended to be merely illustrative and in no way limitative.

EXAMPLE 1 a. A prepolymer having an index of free hydroxile groups of 97 was first prepared. To this end, a reactor was fed with 2,287.2 g of ethyleneglycol, 748.8 g of trimellitic anhydride, 1,270.5 g of isophthalic acid, 2,989.8 g of terephthalic acid and 15 g of dibutyltin oxide. This mixture was heated up to about 180° C. The reaction slightly started at this temperature and the reaction water was continuously distilled off. Thereafter, the temperature was gradually increased up to 240° C and maintained at this value, until water is no longer formed by the reaction.

A vacuum of 50 mm Hg was then applied in order to remove all the volatile products.

b. The resin was then cooled up to 220° C and 1,790.6 g of isophthalic acid were added. The temperature was risen again up to about 240° C and was maintained during 2 hours. A vacuum of 50 mm Hg was applied again in order to remove the last traces of water. The resin was cooled at 200° C and was then discharged. The obtained acid polyester resin had an acid index of 82.3.

c. The powder coating product was then prepared by mixing:
  100 g of the above acid polyester resin
  100 g of an epoxy resin (Epikote 1055) (Registered Trade Mark)
  100 g of titanium dioxide
  0.5 g of 2-phenyl imidazoline
  1.5 g of Modaflow (Registered Trade Mark of Monsanto Co).

The optimum properties of the coating product were obtained by curing the powder during 9 minutes at 200° C.

The properties were the following:

Ericksen : > 8 mm
Direct impact strength : > 36 kg.cm
Inverse impact strength : > 36 kg.cm
Flexion : good
Gloss : 100 .

EXAMPLE 2

A polyester resin and a powder coating product were prepared according the procedure described in Example 1. The properties of this coating product were determined at various curing times and curing temperatures.

Furthermore, and by way of comparison, a resin of a known type was prepared by mixing 1,240 g of ethylene glycol, 375 g of neopentylglycol, 3,581 g of terephthalic acid and 15 g of tetrabutoxytitanate as catalyst. According to the embodiment described in Example 1, a prepolymer was first prepared. Thereafter, the reaction between the prepolymer and 768 g of trimellitic anhydride was performed in order to obtain a tetrafunctional acid polyester resin having an acid index of 86.

The coating product was then prepared by mixing 100 g of that acid polyester resin, 100 g of an epoxy resin (Epikote 1055), 100 g of titanium dioxide, 1 g of 2-phenyl-imidazoline and 1.5 g of Modaflow.

These both resins were submitted to the tests described in Example 1. The obtained results were indicated in the herebelow Tables I to IV.

TABLE I

| Resin of the invention : curing temperature : 200° C. | | | | | | |
|---|---|---|---|---|---|---|
| Curing time | 6' | 8' | 9' | 10' | 12' | 15' |
| Ericksen (mm) | < 0.4 | > 7 | > 8 | > 8 | > 8 | > 8 |
| Direct impact strength (kg.cm) | 23 | > 36 | > 36 | > 36 | > 36 | > 36 |
| Inverse impact strength (kg.cm) | < 5 | < 5 | 36 | > 36 | > 36 | > 36 |
| Flexion | Bad | Bad | Good | Good | Good | Good |

TABLE II

| Comparative resin : curing temperature : 200° C. | | | | |
|---|---|---|---|---|
| Curing time | 8' | 10' | 12' | 15' |
| Ericksen (mm) | < 0.5 | 3 | 4 | > 8 |
| Direct impact strength (kg.cm) | < 10 | < 10 | 20 | > 36 |
| Inverse impact strength | < 5 | < 5 | 5 | > 36 |
| Flexion | Bad | Bad | Bad | Good |

TABLE III

| Resin of the invention : curing temperature : 180° C. | | | | |
|---|---|---|---|---|
| Curing time | 10' | 12' | 15' | 20' |
| Ericksen (mm) | > 8 | > 8 | > 8 | > 8 |
| Direct Impact strength (kg.cm) | > 36 | > 36 | > 36 | > 36 |
| Inverse impact strength (kg.cm) | 20 | 24 | > 36 | > 36 |
| Flexion | Bad | Good | Good | Good |

TABLE IV

| Comparative resin : curing temperature : 180° C. | | | | |
|---|---|---|---|---|
| Curing time | 10' | 12' | 15' | 20' |
| Ericksen (mm) | < 0.5 | < 0.5 | 4 | > 8 |
| Direct impact strength (kg.cm) | < 10 | < 10 | 10 | > 36 |
| Inverse impact strength (kg.cm) | < 5 | < 5 | < 5 | 36 |
| Flexion | Bad | Bad | Bad | Good |

These Tables show that at equal curing temperature and curing time, the product of the invention has better physical properties than those of the comparative product.

Moreover, it must be also noted that in the preparation of the powder coating product, the amount of catalyst may be reduced by half with regard to the known process without being detrimental to the properties of the obtained product.

EXAMPLE 3

A reactor was fed with 2,232 g of ethyleneglycol, 864 g of trimellitic anhydride, 469 g of isophthalic acid, 3,486 g of terephthalic acid and 15 g of dibutyltin oxide. This mixture was heated up to about 180° C. The method described in Example 1 was used to obtain the prepolymer.

The resin was cooled to 220° C and thereafter, 871.5 g of isophthalic acid and 619.5 g of adipic acid were added. The temperature was risen again up to 240° C and was maintained during 2 hours. The method described in Example 1 was used to obtain the acid polyester resin.

The obtained resin had an acid index of 67.

The powder coating product was prepared by mixing:
  100 g of the above polyester resin
  100 g of epoxy resin (Epikote 1055)
  100 g of titanium dioxide
  0.5 g of 2-phenyl-imidazoline
  1.5 g of Modaflow.

The optimum properties of the coating product were obtained with a curing temperature of 200° C and a curing time of 10.5 minutes.

EXAMPLE 4

A reacteur was fed with 2,232 g of ethyleneglycol, 748.2 g of trimellitic anhydride, 1,269.9 of isophthalic acid, 2,988 g of terephthalic acid and 15 g of dibutyltin oxide. This mixture was heated up to about 180° C. The method described in Example 1 was used to obtain the prepolymer. The resin was cooled to 220° C and thereafter 1,494 g of isophthalic acid were added. The temperature was risen again up to about 240° C and was maintained during 2 hours. The method of Example 1 was used to obtain the acid polyester resin.

The obtained resin had an acid index of 66.

The powder coating product was prepared by mixing:
- 100 g of the above polyester resin
- 100 g of epoxy resin (Epikote 1055)
- 100 g of titanium dioxide
- 0.5 g of 2-phenyl-imidazoline
- 1.5 g of Modaflow.

The optimum properties of the coating product were obtained with a curing temperature of 200° C and a curing time of 9 minutes.

EXAMPLE 5

A reactor was fed with 2,287.2 g of ethyleneglycol, 2,241.6 g isophthalic acid, 2,989.8 g of terephthalic acid and 15 g of dibutyltin oxide. The mixture was heated up to about 180° C. The method described in Example 1 was repeated up to obtain the prepolymer. The resin was cooled to 220° C and thereafter 1,790.6 g of isophthalic acid were added. The temperature was risen again up to about 240° C and was maintained during 2 hours. The method described in Example 1 was then used to obtain of the acid polyester resin.

The obtained resin had a functionality of 2 and an acid index of 84.

The powder coating product was prepared by mixing:
- 100 g of the above polyester resin
- 100 g of epoxy resin (Epikote 1055)
- 100 g of titanium dioxide
- 0.5 g of 2-phenyl-imidazoline
- 1.5 g of Modaflow.

The coating product had the following properties after curing at 200° C during 10 minutes.

Ericksen : 7 mm
Direct impact strength (kg.cm): 36
Inverse impact strength (kg.cm): 25
Flexion : Bad.

This example whell shows that the functionality of the resin must preferably be comprised between 2 and 3 in order to obtain significative properties with shorter curing times.

EXAMPLE 6

A reactor was fed with 2,232 g of ethyleneglycol, 748.8 g of trimellitic anhydride, 1,112.2 g of isophthalic acid, 2,989.8 g of terephthalic acid and 15 g of dibutyltin oxide. The mixture was heated up to about 180° C. The method described in Example 1 was used to obtain the prepolymer. The resin was cooled to 220° C and 1,955.5 g of isophthalic acid were added. The temperature was risen again up to about 240° C and was maintained during 2 hours. The method described in Example 1 was then used to obtain the acid polyester resin.

The obtained resin had a functionality comprised between 2 and 3 and an acid index of 92.

The powder coating product was prepared by mixing:
- 80 g of the above polyester resin
- 120 g of epoxy resin (Epikote 1055)
- 100 g of titanium dioxide
- 0.5 g of 2-phenyl-imidazoline
- 1.5 g of Modaflow.

The optimum properties of the coating product were obtained with a curing temperature of 200° C and a curing time of 10 minutes.

What we claim is:

1. Process for producing acid polyester resins which are used to manufacture coating products by reaction with an epoxy resin, said polyester acid resins being produced from a prepolymer having a hydroxyl index comprised between 40 and 200, said prepolymer being prepared from at least one divalent aliphatic alcohol and a mixture of organic acids, this process being characterized by the fact that said mixture of organic acids comprises from 10 to 100% by weight of terephthalic acid, from 0 to 90% by weight of isophthalic acid and from 0 to 20% by weight of trimellitic acid or its anhydride, and that the acid polyester resin is prepared by reacting said prepolymer with isophthalic acid, said acid polyester resin having an acid index comprised between 50 and 100.

2. Process for producing acid polyester resins, according to claim 1, from a prepolymer having a hydroxyl index comprised between 40 and 200, catalytically prepared from at least a divalent aliphatic alcohol used in an amount corresponding to 25 to 35% by weight based on the total weight of the reaction mixture and a mixture of organic acids, this process being characterized by the fact that said mixture preferably comprises from 35 to 50% by weight of terephthalic acid, from 5 to 30% of isophthalic acid and from 8 to 15% of trimellitic acid or its anhydride, and that the acid polyester resin is prepared by reacting this prepolymer with isophthalic acid used in an amount corresponding to 20 to 30% by weight based on the total weight of the reaction mixture.

3. Process according to claim 1 wherein the functionality of the acid polyester resin is comprised between 2 and 3.

4. Process for producing powder coating products, which consists in:
   a. preparing a prepolymer having a hydroxyl index comprised between 40 and 200, from at least one divalent aliphatic alcohol and a mixture of organic acids consisting in 10 to 100% by weight terephthalic acid, 0 to 90% by weight of isophthalic acid and 0 to 20% by weight of trimellitic acid or its anhydride,
   b. by preparing an acid polyester resin having an acid index comprised between 50 and 100 by reacting said prepolymer with isophthalic acid,
   c. reacting said acid polyester resin with an epoxy resin.

5. Process according to claim 4 wherein 20 to 40% by weight of the acid polyester resin are reacted with 20 to 60% by weight of an epoxy resin and 20 to 60% by weight of titanium dioxide.

* * * * *